(12) United States Patent
Pudlowski (10) Patent No.: US 10,490,063 B2
(45) Date of Patent: Nov. 26, 2019

(54) WIRELESS CONTROL DEVICE FOR PREMISES AUTOMATION

(71) Applicant: Fibar Group S.A., Poznan (PL)

(72) Inventor: Adam Pudlowski, Poznan (PL)

(73) Assignee: Fibar Group S.A., Poznan (PL)

( * ) Notice: Subject to any disclaimer, the term of this patent is extended or adjusted under 35 U.S.C. 154(b) by 0 days.

(21) Appl. No.: 15/840,987

(22) Filed: Dec. 13, 2017

(65) Prior Publication Data
US 2018/0268684 A1   Sep. 20, 2018

Related U.S. Application Data

(60) Provisional application No. 62/471,036, filed on Mar. 14, 2017.

(51) Int. Cl.
*G08C 17/02* (2006.01)
*H04W 76/10* (2018.01)

(52) U.S. Cl.
CPC ......... *G08C 17/02* (2013.01); *G08C 2201/32* (2013.01); *H04W 76/10* (2018.02)

(58) Field of Classification Search
None
See application file for complete search history.

(56) References Cited

U.S. PATENT DOCUMENTS

| 8,621,348 | B2 * | 12/2013 | Ramsay | G06F 1/1626 715/702 |
| 9,024,717 | B2 * | 5/2015 | Songakul | H04L 12/2838 340/4.3 |
| 9,134,800 | B2 * | 9/2015 | Maeda | G06F 3/017 |

* cited by examiner

*Primary Examiner* — K. Wong
(74) *Attorney, Agent, or Firm* — McAndrews, Held & Malloy, Ltd.

(57) ABSTRACT

A method for managing at least one network element device in a network using a network manager device and a wireless control device. The method may include associating at least one scene with at least one actuator of the wireless control device. The wireless control device may detect at least one actuation of the at least one actuator. Subsequent to the detection of the at least one actuation, the wireless control device may sense a movement of the wireless control device with an accelerometer in the wireless control device. The wireless control device may then send a communication regarding a character of the movement from the wireless control device to the network manager device. The network manager device may instruct the at least one network element device to implement the scene based at least in part on the character of the movement.

18 Claims, 4 Drawing Sheets

WIRELESS CONTROL DEVICE FOR PREMISES AUTOMATION

CROSS REFERENCE TO RELATED APPLICATIONS

This application claims priority to U.S. Pat. Appl. Ser. No. 62/471,036 filed on Mar. 14, 2017, which is herein incorporated by reference in its entirety.

BACKGROUND

Certain embodiments of the disclosure relate to premises automation systems (e.g., home, commercial, or industrial premises automation systems). More specifically, certain embodiments of the disclosure relate to techniques for a wireless control device for controlling premises automation.

Existing methods and systems for providing device monitoring or control for premises automation can be costly, cumbersome and inefficient. Further limitations and disadvantages of conventional and traditional approaches will become apparent to one of skill in the art, through comparison of such systems with the present disclosure as set forth in the remainder of the present application with reference to the drawings.

SUMMARY

A method for managing at least one network element device in a network uses a network manager device and a wireless control device.

In one embodiment, the method may comprise: associating at least one scene with at least one actuator of the wireless control device; detecting at least one actuation of the at least one actuator; subsequent to the detection of the at least one actuation, sensing a movement of the wireless control device with an accelerometer in the wireless control device; sending a communication regarding a character of the movement from the wireless control device to the network manager device; and instructing, by the network manager device, the at least one network element device to implement the scene based at least in part on the character of the movement.

In some embodiments, the at least one network element device may comprise multiple network element devices that implement the scene.

In some embodiments, the character of the movement may comprise whether the wireless control device is moving or not moving.

In some embodiments, the character of the movement may comprise an acceleration of the movement of the wireless control device.

In some embodiments, the character of the movement may comprise a duration of the movement of the wireless control device.

In some embodiments, the character of the movement may comprise a dimension of the movement of the wireless control device.

In some embodiments, the at least one actuation may comprise only one actuation.

In some embodiments, the at least one actuation may comprise a plurality of actuations.

In some embodiments, sensing a movement of the wireless control device further may comprise sensing a movement of the wireless control device while an actuation of the at least one actuator is being detected.

In some embodiments, the method may further comprise: associating a plurality of scenes with a respective plurality actuators of the wireless control device; and determining which of the plurality of actuators has been actuated, wherein the communication further may comprise an identity of the determined one of the plurality of actuators.

In another embodiment, according to certain inventive techniques, a method for operating a network manager device. The method may comprise associating at least one scene with at least one actuator of the wireless control device; receiving from a wireless control device a communication comprising a character of the movement of the wireless control device; and instructing, the at least one network element device to implement the scene based at least in part on the character of the movement.

In some embodiments, the at least one network element device may comprise multiple network element devices that implement the scene.

In some embodiments, the character of the movement may comprise whether the wireless control device is moving or not moving.

In some embodiments, the character of the movement may comprise an acceleration of the movement of the wireless control device.

In some embodiments, the character of the movement may comprise a duration of the movement of the wireless control device.

In some embodiments, the character of the movement may comprise a dimension of the movement of the wireless control device.

In another embodiment, according to certain inventive techniques, a wireless control device may comprise: at least one actuator configured to receive at least one actuation; an accelerometer; a processor; and wireless communication circuitry. The processor may be configured to detect the at least one actuation of the at least one actuator. The accelerometer may be configured to, subsequent to the detection of the at least one actuation, sense a movement of the wireless control device and generate a movement signal regarding a character of the movement. The processor may be configured to receive the movement signal and translate the movement signal into a communication. The wireless communication circuitry may be configured to receive the communication and wirelessly transmit the communication.

In some embodiments, the character of the movement may comprise whether the wireless control device is moving or not moving.

In some embodiments, the character of the movement may comprise an acceleration of the movement of the wireless control device.

In some embodiments, the character of the movement may comprise a duration of the movement of the wireless control device.

In some embodiments, the character of the movement may comprise a dimension of the movement of the wireless control device.

In some embodiments, the at least one actuation may comprise only one actuation.

In some embodiments, the at least one actuation may comprise a plurality of actuations.

In some embodiments, the accelerometer may be configured to sense the movement of the wireless control device simultaneously while the processor detects an actuation of the at least one actuator.

In some embodiments the wireless control device may further comprise a plurality of actuators. The processor may be configured to determine which of the plurality of actuators has been actuated; and the communication further may comprise an identity of the determined one of the plurality of actuators.

Various advantages, aspects and novel features of the present disclosure, as well as details of an illustrated embodiment thereof, will be more fully understood from the following description and drawings.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION OF THE DISCLOSURE

As utilized herein the terms "circuit" and "circuitry" refer to physical electronic components (i.e., hardware) and any software and/or firmware ("code") which may configure the hardware, be executed by the hardware, and/or otherwise be associated with the hardware. As utilized herein, "and/or" means any one or more of the items in the list joined by "and/or." As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g." and "for example" set off lists of one or more non-limiting examples, instances, or illustrations. As utilized herein, a device/module/circuitry/etc. is "operable" to perform a function whenever the device/module/circuitry/etc. comprises the necessary hardware and code (if any is necessary) to perform the function, regardless of whether performance of the function is disabled, or not enabled, by some user-configurable setting.

Figure 1:
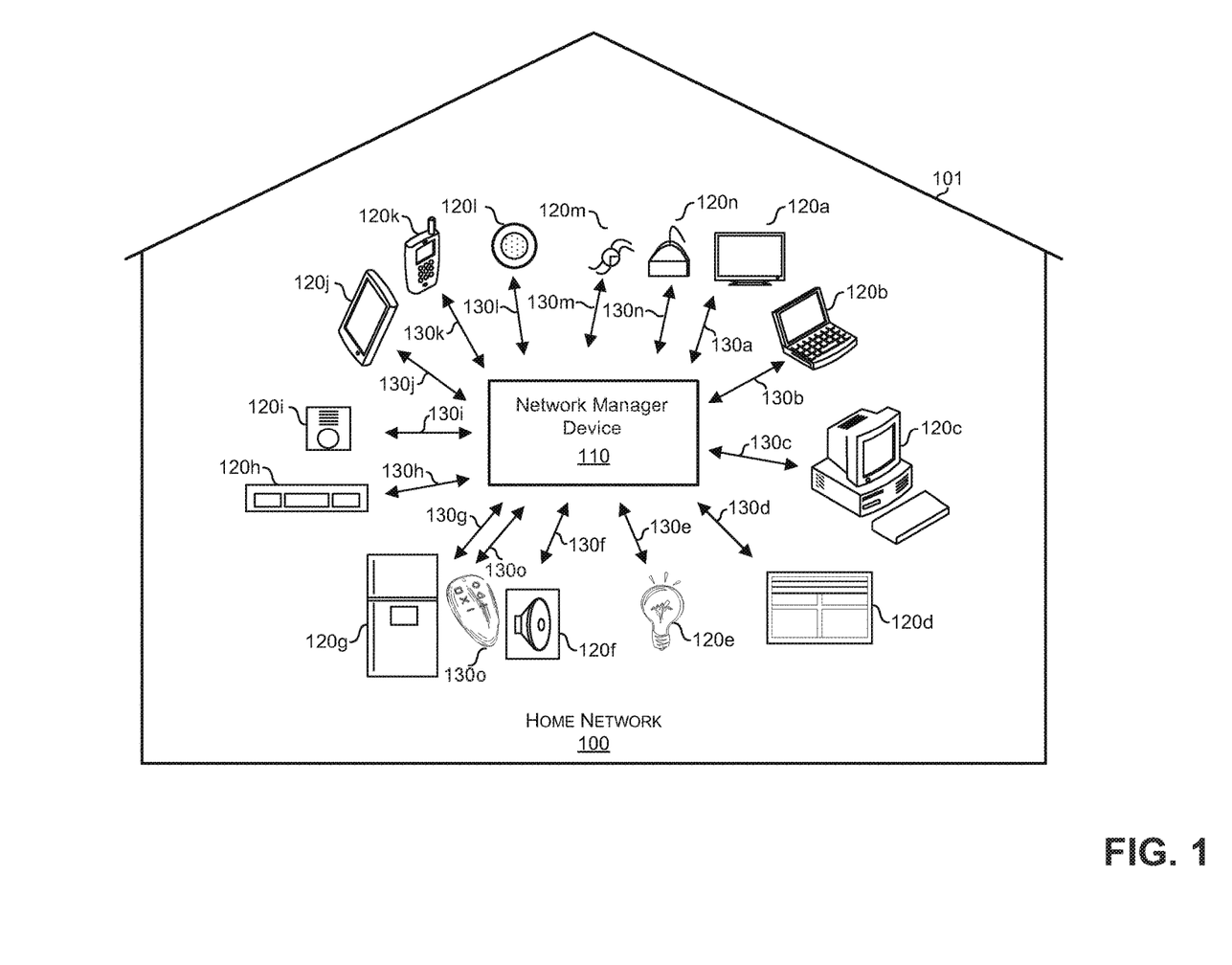
FIG. 1 is a block diagram illustrating an example premises network, in accordance with an example embodiment of the disclosure.

Referring to FIG. 1, there is shown a network 100. The network 100 may correspond to location or premises 101. The location 101 may, for example, correspond to a residence (e.g., home, apartment) or non-residence premises (e.g., small business, school, library, factory, etc.). In this regard, the network 100 may, for example, comprise a plurality of network elements, such as, for example, a plurality of network element devices 120a-120o. The network elements (e.g., network element devices 120a-120o) may, for example, comprise one or more devices (e.g., electrical devices), systems, fixtures, appliances, and/or other circuitry. The network elements (e.g., network element devices 120a-120o) may comprise, for example, one or more televisions 120a, one or more computers (e.g., laptop computer 120b, desktop computer 120c), one or more personal and/or handheld devices (e.g., tablet 120j, mobile/smart phone 120k, smart watch 120m), one or more multimedia devices and/or components (e.g., speakers 120f), one or more structural fixtures (e.g., windows/window blinds 120d), one or more lighting and/or electrical fixtures 120e, one or more appliances (e.g., refrigerator 120g), one or more environmental sensory devices 120h (e.g., thermometers, humidity meters), one or more security devices 120i (e.g., a smoke detector, a carbon monoxide detector, a security alarm, a motion detector), one or more sensors and/or controller (e.g., intelligent motion sensor 120l, RGBW controller 120n), one or more wireless control devices 120o, and/or other devices.

The disclosure is not limited to any particular type of a network. Furthermore, the disclosure is not limited to any particular combination of network element devices 120a-120o. The network 100 may comprise a network manager device 110. The network manager device 110 may comprise suitable circuitry, interfaces, logic, and/or code for implementing various aspects of the present disclosure. For example, the network manager device 110 may be configured for use in managing, servicing, and/or interacting with one or more network element devices 120a-120o, for automation, for example.

Although the network manager device 110 is illustrated as a single device, the disclosure is not limited in this way. For example, the network manager device 110 may comprise one or more network manager devices that may each interact with one or more network element devices 120a-120o. In an example embodiment of the disclosure, each of the one or more network manager devices 110 may be associated with particular one or more network element devices 120a-120o. In another example, one or more of the one or more network manager devices 110 may be associated with any one or more network element devices 120a-120o (e.g., network element devices 110 within range of a particular network manager device 110, with best communication path).

In an example embodiment of the disclosure, one or more network manager devices 110 may form a network of network managers to support management and/or control of one or more network element devices 120a-120o in one or more locations. The locations may be related. For example, the locations may be defined for a particular region or regions (e.g., building, floor) and/or for a particular association. The association may, for example, be defined based on a user (e.g., home location, work location).

In an example embodiment of the disclosure, the network manager device 110 may be pre-programmed and/or programmable, via a computing device such as a personal computer (e.g., laptop computer 120b, desktop computer 120c), and/or handheld devices (e.g., tablet 120j, mobile/smart phone 120k, smart watch 120m), to control one or more network element devices 120a-120o. In this regard, the network manager 110 may be programmed or configured via a computing device such as a personal computer (e.g., laptop computer 120b, desktop computer 120c), and/or handheld devices (e.g., tablet 120j, mobile/smart phone 120k, smart watch 120m).

The network manager device 110 may interact with one or more of the network element devices 120a-120o via corresponding links 130a-130o, which may be supported by the network manager device 110 and/or the corresponding network element device(s). For example, the links 130a-130o may be implemented and/or configured to operate using a wireless protocol, such as, for example, a Z-Wave protocol. In an example embodiment of the disclosure, the network 100 may be implemented as Z-Wave network. However, the disclosure is not limited in this way. For example, the network 110 may comprise one or more wired and/or wireless links and/or protocol. Wireless links and/or protocols, may comprise, for example, WPAN (e.g., Bluetooth or ZigBee), low power links (e.g., Bluetooth LE (BLE), Bluetooth Smart, iBeacon), near field communication protocols (e.g., NFC) and/or WLAN protocols (e.g., 802.11) and/or any other wireless links and/or protocols suitable for implementation consistent with the disclosure. Wired protocols and/or links may comprise, for example, Ethernet, Universal Serial Bus (USB), and/or any other wired links and/or protocols suitable for implementation consistent with the disclosure.

In an example embodiment of the disclosure, network manager device 110 may interact with one or more network element devices 120a-120o, directly and/or indirectly. For example, the network manager device 110 may interact with one or more network element devices 120a-120o, directly through a corresponding link (e.g., wireless, wired link/connection).

In another example, the network manager device 110 may interact with one or more network element devices 120a-120o, indirectly through, for example, a converter (e.g., global cache.) In this regard, the network manager device 110 that supports one or more particular network interfaces and/or other interfaces (e.g., USB) may be operable to interact with a particular network element (and/or another device) that may otherwise be incompatible with one or more of the one or more particular network and/or other interfaces supported by the network manger 110. The interaction may be achieved through, for example, a converter and/or a translator. The converter and/or the translator may each comprise suitable logic, circuitry, interfaces, and/or code that may be operable to facilitate communication between the network manager device 110 and one or more network element devices 120a-120o.

In another example, the network manager device 110 may interact with one or more network element devices 120a-120o, indirectly through, for example, other network element devices 120a-120o. In this regard, the network manager device 110 may interact with one or more network element devices 120a-120o, on, for example, a mesh network. An example mesh network (not shown) may facilitate communication (e.g., transmission of messages, signals, data frames) to and/or from the network manager device (e.g., the network manager device 110) to and/or from a particular network element device where the communication may, for example, pass through one or more other network element device before reaching the particular network element and/or the network manager device 110.

In an example embodiment of the disclosure, the network manager device 110 may be operable to support one or more communication methods from one or more other network devices (e.g., network element devices 120a-120o). For example, one or more network element devices 120a-120o, may communicate with the network manager device 110 utilizing a particular wireless link and/or protocol (e.g., Z-Wave) and/or a particular wired link and/or protocol (e.g., Ethernet), while one or more other network element devices 120a-120o, may communicate with the network manager device 110 utilizing a different particular wireless link and/or protocol (e.g., WiFi) and/or a different particular wired link and/or protocol (e.g., USB).

In an example embodiment of the disclosure, the same one or more network element devices 120a-120o may communicate with the network manager device 110 by, for example, using one or more wired and/or wireless links and/or protocols at the same and/or at different times. For example, a particular network element may communicate with the network manager device 110 using a Z-Wave communication protocol for a particular communication and may communicate with the network manager device 110 using a WiFi communication protocol for another particular communication.

In an example embodiment of the disclosure, one or more network element devices 120a-120o, may communicate with one or more element devices 120a-120o, directly. In this regard, the one or more network elements may utilize one or more communication links (e.g., wireless, wired) (not shown) and/or one or more network interfaces and/or other interfaces without directing (e.g., routing the communication thought, for example, a network manager device (e.g., the network manger 110). For example, a network element device may be operable to detect existence of one or more other network element devices (e.g., on the same and/or different network) and may initiate, send and/or receive communication to and/or from the one or more other network element devices 120a-120o.

In an example embodiment of the disclosure, one network element device 120a-120o may be out of range of a network manager device and may communicate with one or more other network element devices 120a-120o to determine whether the one or more other network element devices are within range of a particular network manager 110 (e.g., a network manager 110 device previously within range of the one network element) and/or any network manager 110. The range detection and/or discovery may continue from one network element device to another. For example, a particular network element device in a particular instance may need to communicate through more than one other network element device in order to, for example, communicate with a desired network element device and/or a desired, particular and/or any network manager device (e.g., the network manager device 110). The disclosure is not limited to a communication for a purpose of range discovery/detection. The communication may comprise any type of communication and may be used for a variety of other purposes (e.g., communicating with a different network element device, communicating with a network manager device 110, controlling an out of range device, controlling another network element device).

In an example embodiment of the disclosure, one or more network element devices 120a-120o, and/or other devices that may be operable to communicate on the network (and/or an associated network as described herewith) and/or that may not be operable to communicate on the network but may otherwise be tractable (e.g., GPS, iBeacon, electronic tag), with one or more other network elements, devices and/or a network manager (e.g., network manager device 110) associated with a particular network (e.g., network 100 and/or an associated network as described herewith), may communicate with each other, other devices (e.g., on the same network, another network and/or otherwise connected and/or tractable) and/or the network manager 110, and/or may be operable to determine a precise location of a particular network element, device and/or network manager 110 utilizing various communication protocols and/or interfaces.

For example, one or more network elements (and/or other devices operable on the network, an associated network as described herewith and/or otherwise traceable) may be operable to generate and/or receive communications and/or one more signals and/or messages that may be utilized in determining a location of a particular network element, device and/or network manager. In this regard, a near field communication and/or a low power interface protocol (e.g., BLE, iBeacon) may be utilized for communication between the elements, devices and/or network managers. Furthermore, one more tags (e.g., small electronic devices) may be utilized, to facilitate location of particular elements, devices and/or network managers. For example, a network element, device and/or network manager device may generate a communication and/or signal and/or a message (on the network, on an associated network and/or through a built in, external, portable and/or otherwise attachable tag) that may be received by another network element, device and/or network manager.

In an example embodiment of the disclosure, one or more network element devices 120a-120o, and/or network manager devices 110 may cooperate (e.g., exchange information) to, for example, collectively and/or individually determine a precise location of a particular network elements, device and/or network manager based on the received one or more communications and/or signals and/or messages. As an example only, a particular network element device 120a-120o and/or network manager device 110 may generate a communication and/or signal and/or a message that may be received by other network element, device and/or network device within a particular time frame. The information about the time it took to, for example, receive the particular one or more communications and/or signals and/or messages (and/or the information gather from the one or more communications and/or signals and/or messages, such as, for example, signal strength) may be used to determine the precise location (e.g., distance to/from the network element, device, network manager that received the particular one or more signals and/or message) of the particular network element, device and/or network manager.

In operation, the network manager device 110 may be operable to manage a network (e.g., the network 100), for example, for automation. The network manager device 110 may be utilized, for example, as an interface platform for interacting with various network elements (e.g., the network element devices 120a-120o). In this regard, the network manager device 110 may support establishing and/or configuring one or more communication connections/links (e.g., the links 130a-130o) with the one or more elements of the network 110. Once established, the connectivity between the network manager device 110 and the network elements (e.g., network element devices 120a-120o) may, for example, be utilized to enable centralized monitoring, control, and/or management of the network elements, and/or of the network 100 as a whole.

For example, the wireless control device 120o, via the network manager device 110, may be operable to: control operations of certain other network element devices 120a-120n (e.g., turn on television 120a, switch to particular channel(s) at particular days/times, and/or record if recording is supported); monitor environment in the network 100, such as by obtaining environmental readings (e.g., temperature, humidity, etc.) via example environmental sensory devices 120h, and may process these readings (e.g., to determine if/when to adjust other network elements accordingly); adjust one or more example lighting and/or electrical fixtures 120e (e.g., turn lights on or off); lower/raise example window (blinds) 120d; adjust operations of example appliances (e.g., refrigerator 120g), such as, for example, based on a preconfigured power efficiency/optimization profile; or monitor for any indications of a security/safety problem, based on, for example, input from example security devices 120i, and/or act accordingly (e.g., send notifications to users, such as by texting example smart phone 120k, and/or automatically notify authorities, e.g., by dialing "911" and/or contacting preconfigured emergency numbers).

In an example embodiment of the disclosure, the network manager device 110 may provide and/or utilize user interface services in the network. In this regard, the network manager device 110 may be operable to support use of user interface functions, and/or to generate and/or store information corresponding thereto, which may be utilized to enable interactions between the network manager device 110 and users (e.g., in the network 100). For example, in some implementations, the network manager device 110 may be configured to generate and/or use a graphic user interface (GUI), for visually displaying information and/or providing interactivity with users (e.g., for providing input thereby). One or more user interfaces may enable configuring the network manager device 110 and/or functions provided by the network manager device 110. In an example embodiment of the disclosure, the one or more user interfaces may enable user interaction with, configuring and/or adjusting other elements in the network 100 (e.g., elements connected to the network manager device 110). In an example embodiment of the disclosure, a GUI may be operable to control one or more network managers that may, for example, be associated with a particular location and/or user.

In an example embodiment of the disclosure, the user interfaces may be provided via one or more other devices (e.g., computing devices or wireless control devices) that may be communicatively coupled to the network manager device 110. As an another example, a GUI generated and/or used by the network manager device 110 may be displayed using existing network elements devices, such as, for example, television 120a, laptop 120b, tablet 120j, and/or smart phone 120k.

The disclosure is not limited to a single network (e.g., network 100) and/or a single network manager (e.g., network manager device 110). For example, one or more networks (e.g., network 100) and/or one or more network managers (e.g., network manager device 110) may be grouped together. The grouping may correspond to one or more locations (e.g., location 101).

In an example embodiment of the disclosure, a network (e.g., network 100) may be associated with one or more network managers (e.g., network manager device 110). For example, one network manager may be associated with one or more networks (e.g., network 100) and/or locations (e.g., location 101), In an example embodiment of the disclosure, a grouping of networks may comprise one or more network, network managers and/or locations. The grouping may be programmable and/or configurable. For example, one more networks may be defined, one or more network managers may be assigned per network and/or associated with one or more devices with a network and/or a network manager. In this regard, the information may be shared between the different networks, network managers and/or devices assigned to the different networks and/or network managers. For example, information gathered on one network (e.g., by a network device, through an occurrence of a condition, event, an alarm, and/or other predefined and/or preconfigured condition) may cause the information to be communicated on the same and/or another associated network. In this regard, the information may trigger a condition, an alarm, an occurrence of an event and/or any other predefined and/or preconfigured condition (e.g., operation of a device, network element) on the same and/or another associated network.

Figure 2:
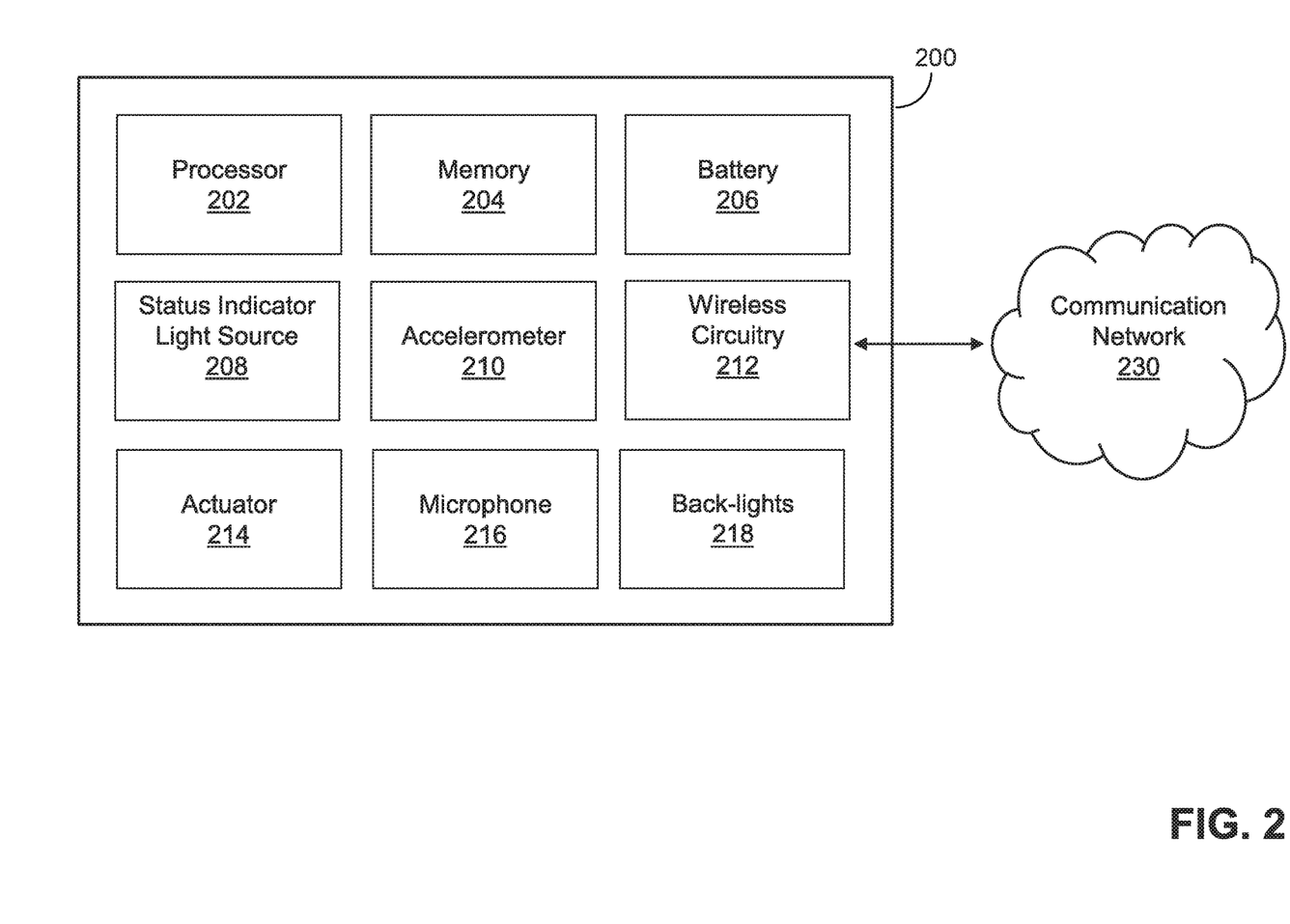
FIG. 2 is a block diagram illustrating an example wireless control device, in accordance with an example embodiment of the disclosure.

FIG. 2 is a block diagram illustrating an example wireless control device 200, in accordance with an example embodiment of the disclosure. The example wireless control device 200 as shown and described with respect to FIG. 2 may, for example, comprise an example wireless control device 120o as shown and described with respect to FIG. 1. The wireless control device 200 may comprise, for example, a processor 202, memory 204, a battery 206, a status indicator light source 208, an accelerometer 210, wireless circuitry 212, at least one actuator 214, or a microphone 216. FIG. 2 also shows a communication network 230. In an example embodiment of the disclosure, the wireless control device 200 may be a compact device that is sized to fit on a key chain and to be carried in a pants-pocket or purse. For example, the wireless control device 200 may comprise dimensions of approximately 38 mm width by 70 mm length by 17 mm thickness and be generally bean-shaped. Other shapes such as rectangular, ovate, circular, triangular, etc. are also possible. It is to be understood that the wireless control device 200 of present disclosure is not limited to any particular size or dimension set of dimension and that the example dimension and shape have been provided only to illustrate the compact nature of the wireless control device 200.

The processor 202 may comprise suitable logic, circuitry, interfaces and/or code that may be operable to manage and/or control operations of various components and/or modules in the wireless control device 200. As utilized herein, the term "processor" can include a single processor or multiple processors. The processor 202 may utilize an operating system (OS) that enables the execution of various functions, commands, and/or applications. The processor 202 may be one processor or a plurality of processors operating in a coordinated way to achieve a desired function/result.

The memory 204 may be operable to store information such as executable instructions and/or data that may be utilized by the processor 202 and/or other modules or components in the wireless control device 200. The memory 204 may comprise RAM, ROM, low-latency nonvolatile memory such as flash memory, EEPROM and/or other suitable electronic data storage.

The battery 206 may be operable to provide power to the various components and/or modules in the wireless control device 200. As utilized herein, the term "battery" can include a single battery or multiple batteries. The battery 206 may comprise a single-cell or multi-cell lithium type battery. For example, a 3V CR2450 Lithium Coin Cell battery may be used. Alternatively, alkaline or zinc-carbon batteries (including AA, AAA, C, D, and 9V type batteries), lithium polymer, NiMH or NiCd, and/or lead-acid type batteries may be used.

The status indicator light source 208 ("light source") may comprise one or more light emitting diodes (LEDs) optionally of different colors. The light source 208 may be mounted within an enclosure 201 of the wireless control device 200 and configured to emit light visible from the exterior of the enclosure 201 through at least one aperture. The light source 208 may be positioned proximate the top of the wireless control device 200 and separate from the at least one actuator 214. The processor 202 may control the light source 208 and may be programmed to convey different information based on the color and/or type of light emission. For example, the following functions may be programmed:

| Light Emission | Meaning |
| --- | --- |
| Green Blink | Communication confirmed by a network manager (e.g., network manager device 110) and associated devices; and/or device added |
| Yellow Blink (periodically, e.g., at 1 s intervals) | Communication in progress |
| Red Blink | Communication was not confirmed by a network manager (e.g., network manager device 110) or associated devices; and/or a device was not added; and/or wireless control device 200 is locked |
| Blue Pulse | A sequence is being entered via the actuators 214 on the wireless control device 200 |
| 3 blue pulses | Entered sequence is valid |
| 3 red pulses | Entered sequence is not valid |
| Fast white pulsing | Wireless control device is in adding mode |
| Red to green transition | Wireless control device 200 is unlocked |
| Green to red transition | Wireless control device 200 is locked |
| 3 magenta pulses | Low battery |
| 2 white pulses | Wireless control device 200 has woken up |

The disclosure is not limited to the example light emissions and their associated meanings as shown in the table above. It is understood that the light emissions and their associated meanings can be customized consistent with the disclosure.

The accelerometer 210 may be operable to detect a movement of the wireless control device 200. As utilized herein, the term "accelerometer" can include a single accelerometer or multiple accelerometers or may include a micromachined microelectromechanical system (MEMS). The accelerometer 210 may comprise a single-axis or multi-axis accelerometer (in which at least two accelerometers would be implemented). For example, the accelerometer may be able to detect the following: (1) whether the wireless control device 200 is moving or not moving; (2) the acceleration of the wireless control device 200; (3) the duration of the movement of the wireless control device 200; and/or (4) the dimension of the movement of the wireless control device 200. The accelerometer 210 may be configured to generate a movement signal relating to a character of the movement. A character of the movement may include the duration, acceleration, speed, and/or dimension of the movement. The local processor may determine these characters locally, or the raw data from the accelerometer 210 may be transmitted remotely (for example, to the network manager 110) where the data is interpreted/processed to determine the characters.

The wireless circuitry 212 (for example, including a transceiver) may be operable to provide wired and/or wireless interface with the communication network 230. The communication network 230 may comprise suitable logic, circuitry, interfaces, devices and/or code that may be operable to provide voice and data communication services to various electrical devices, such as the network manager device 110 and other devices, by using wired or wireless communication technologies (e.g., Z-Wave, Ethernet, WiFi, LTE, WiMAX, etc.). The communication network 230 may comprise, for example, local area network (LAN), Internet and/or other multimedia network. Alternatively, the communication network 230 may comprise a Z-Wave mesh network architecture. In such an embodiment, the wireless circuitry 212 may comprise suitable logic, circuitry, interfaces and/or code that may be operable to provide Z-Wave communication capabilities for the network manager device 110. After an inclusion (pairing) process for each of the one or more network element devices 120a-120o and a wireless control device 200, the network manager device 110 and the one or more network element devices 120a-120o and wireless control device 200 may be coupled and may communicate with each other using Z-Wave communication in the mesh network 230 environment.

The at least one actuator 214 may be configured to actuate and the processor 202 may operable to detect an actuation of the at least one actuator 214. The at least one actuator 214 may comprise a physical button. The at least one actuator 214 may be associated with a corresponding back-light 218 (depicted in FIG. 2), which may comprise one or more LEDs optionally of different colors. The at least one actuator 214 may at least in part by constructed of a translucent material to allow light from the back-light 218 to pass through the at least one actuator 214 and be visible from the exterior of the wireless control device 200. A given back-light 218 may provide feedback (for example, blink or get brighter) that a corresponding actuator 214 has been actuated. Back-lights 218 may turn off or go to a dimmer state when no device movement is detected for a pre-determined period of time. The back-lights 218 may then turn on or brighten when movement is detected (for example, by the accelerometer 210).

In one example embodiment, the at least one actuator 214 may comprise six actuators 214a, 214b, 214c, 214d, 214e, and 214f. Each of actuators 214a, 214b, 214c, 214d, 214e, and/or 214f may comprise a different shape. For example, actuator 214a may comprise a square shape, actuator 214b may comprise an "X" shape, actuator 214c may comprise a "–" shape, actuator 214d may comprise a circular shape, actuator 214e may comprise a triangular shape, and actuator 214f may comprise a "+" shape. Each of actuators 214a, 214b, 214c, 214d, 214e, and/or 214f may be associated a different colored back-light 218. The at least one actuator 214 may comprise more or less actuators as described above. It is to be understood that the present disclosure is not limited to any particular shape of the at least one actuator 214.

The processor 202 may be configured to detect an actuation of the at least one actuator 214. The processor 202 may be able to detect the following: (1) whether the at least one actuator 214 is actuated or not actuated; (2) how many times the at least one actuator 214 is actuated; (3) the identity of the at least one actuator 214; and/or (4) a duration of the actuation of the at least one actuator 214. The processor 202 may be able to attribute different functions based on the type of actuation. For example, the processor 202 may be able to detect whether the at least one actuator 214 was actuated in succession within a pre-defined period of time: for example once, twice, three times, etc. In the example embodiment comprising actuators 214a, 214b, 214c, 214d, 214e, and 214f for example, the processor 202 may be able to detect a sequence of actuations including the order, duration, and number of actuations of each of actuators 214a, 214b, 214c, 214d, 214e, and 214f.

The microphone 216 may be operable to detect an auditory signal. As utilized herein, the term "microphone" can include a single microphone or multiple microphones. The processor 202 may be configured to recognize different signals generated by the microphone 216 in response to pre-defined sound characteristics. For example, the processor 202 could associate the microphone's detection of the auditory spoken word "volume" to be associated with increasing or decreasing the volume of television (e.g., television 120a).

In one example embodiment, the accelerometer 210 may be configured to detect the movement of the wireless control device 200 subsequent to the processor 202 detecting an actuation of the at least one actuator 214. Alternatively, the accelerometer 210 may be configured to detect the movement of the wireless control device 200 concurrent to the processor 202 detecting an actuation of the at least one actuator 214. In another embodiment, the accelerometer 210 may be configured to detect the movement of the wireless control device 200 subsequent to the processor 202 detecting a pre-defined sound through the microphone 216.

Using the inputs connected to (directly or indirectly) the accelerometer 210, at least one actuator 214, and/or microphone 216, the processor 202 may be configured to transmit a communication, via the wireless circuitry 212 and communication network 230, to the network manager device 110. The network manager device 110 may be able to detect the communication transmitted by the wireless control device 200. The network manager device 110 may then use the communication to monitor, control, and/or manage the network element devices 120a-120o that are connected to the network 100 as described above. In operation, a user may actuate the at least one actuator 214 and physically raise or lower the wireless control device 200 to control operations of certain network element devices (e.g., increase or decrease the volume of television (e.g., television 120a); increase or decrease set temperature of environmental sensory devices (e.g., environmental sensory device 120h (e.g., smart thermostat)); brighten or darken the light of a connector lighting and/or electrical fixtures (e.g., lighting and/or electrical fixture 120e); and/or lower or raise window blinds (e.g., window blinds 120d)).

Figure 3:
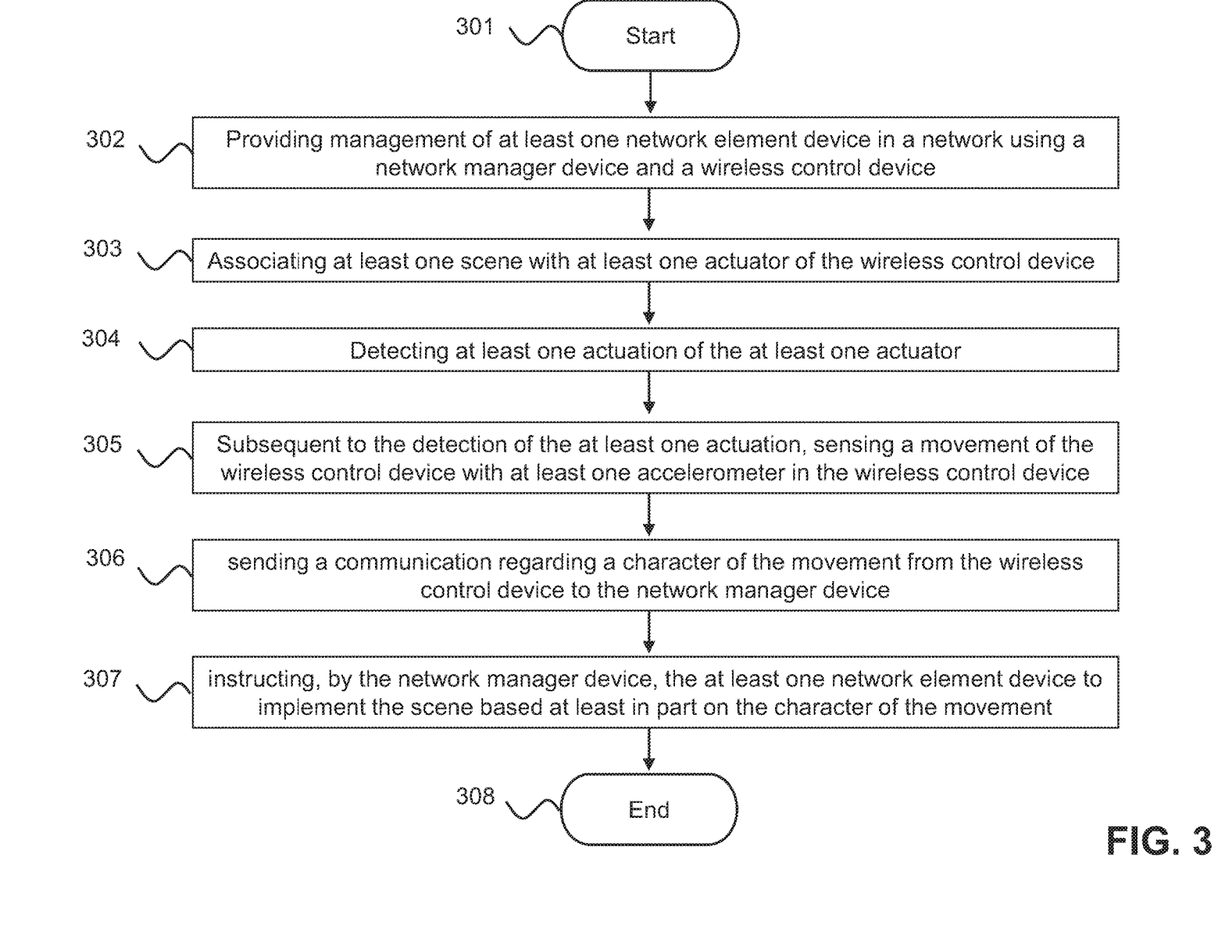
FIG. 3 is a flow chart illustrating example steps for wirelessly controlling a network with a wireless control device, in accordance with an example embodiment of the disclosure.
Figure 4:
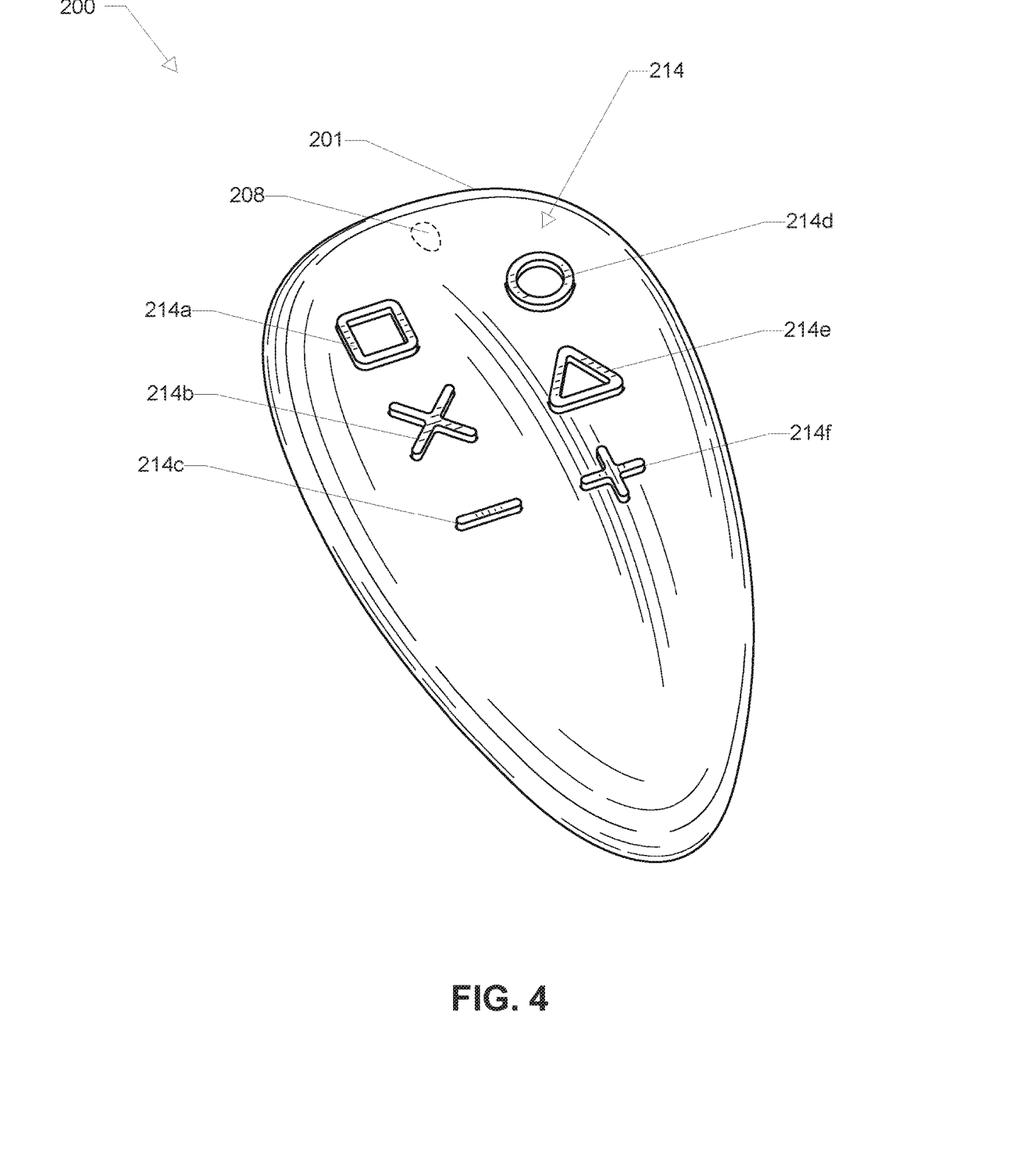
FIG. 4 is a perspective view of a wireless control device, in accordance with an example embodiment of the disclosure.

FIG. 3 is a flow chart illustrating example steps for providing management by at least one network manager device, in accordance with an example embodiment of the disclosure. Referring to FIG. 3, the example steps start at step 301. In step 302, the processor 202 in the wireless control device 120o or 200 may be operable to provide management of more network element devices 120a-120o via the network manager device 110 that are part of the network 100. At step 303 the network manager 110 may associate at least one scene with at least one actuator 214 of the wireless control device 120o or 200. At step 304, the processor 202 may detect at least one actuation of the at least one actuator 214. At step 305, and subsequent to the detection of the at least one actuation, the processor 202 may sense a movement of the wireless control device 120o or 200 via an accelerometer 210 in the wireless control device 120o or 200. At step 306, the wireless circuitry 212 may send a communication regarding a character of the movement from the wireless control device 120o or 200 to the network manager device 110. At step 307, the network manager device 110 may instruct at least one network element device 120a-120o to implement the scene based at least in part on the character of the movement. The example steps may proceed to the end step 308. It is to be understood that the present disclosure is not limited the specific order of steps 301 to 308—other orders are possible.

For example, at step 302, the wireless control device may be turned on by pressing one or more of the at least one actuator(s) 214. Next, the wireless control device 120o or 200 may be put in a pairing mode by pressing a sequence of the at least one actuator(s) 214 (for example pressing the at least one actuator(s) 214 three times in rapid succession). Once the wireless control device 120o or 200 is in a pairing mode, the wireless control device 120o or 200 may be connected via wireless link (e.g., wireless link 130o) to the network manager device 110 by placing the wireless control device 120o or 200 in proximity of the network manager device 110. The link 130o may operate using a wireless protocol, such as, for example, a Z-Wave protocol. At step 303, the wireless control device 120o or 200 may be put in a learning mode by pressing a sequence of the at least one actuator(s) 214 (for example pressing and holding two of the at least one actuator(s) 214). Once the wireless control device 120o or 200 is in a learning mode, the network manager device 110 may transmit pre-configured configuration communications to the wireless control device 120o or 200. The configuration communication may include at least one association. An association may be control a function of one or more network devices 120a-120o assigned to at least one actuator(s) 214. An association may also include a scene for controlling multiple network devices 120a-120o. At step 304, a first actuator 214 is pressed. At step 305, while the actuator 214 is pressed, the wireless control device 120o or 200 may be moved by a user, for example, upwardly in a vertical dimension. At step 306, the wireless control device 120o or 200 may send a communication to the network manager device 110. At step 307, the network manager device 110 may recognize that the actuator 214 that was pressed is associated with lights (e.g., lights 120e) connected to the network manager device 110 via a link (e.g., link 130e). The network manager device 110 may also recognize that the wireless control device 200 was moved upwardly in a vertical dimension. The network manager device 110 may then translate the communication into a function command for the lights (e.g., lights 120e) and may communicate the function command via the link (e.g., link 130e) and, as a result, the lights (e.g., lights 120e) may brighten.

An example scene may comprise associating multiple network element devices 120a-120n and functions together. For example, a scene may include simultaneously dimming lights (e.g., lights 120e), lowering the blinds (e.g., blinds 120d), and playing music through speakers (e.g., speakers 120f). In such an example embodiment both the network manager device 110 may monitor, control, and/or manage each of the example network element devices (e.g., network element devices 120d, 120e, and 120f), upon receiving the corresponding communication from the wireless control device 120o or 200. As discussed above, the communication may include the character of the movement of the wireless control device 120o or 200. In an example embodiment, the network manager device 110 may be able to recognize, for example, that the character of the movement comprised physically lifting the wireless control device 120o or 200. The network manager device 110 may then translate the character of the movement into a function associated with whichever particular scene was activated when the processor 202 detected an actuation of the at least one actuator 214. For example, the network manager device 110 may correspondingly raise the volume of the speaker (e.g., speakers 120f) in the example scene described above.

Alternatively, the wireless control device 120o or 200 may communicate directly with the network devices 120a-120o. In an example embodiment, the scenes are programmed on the memory 204. The processor 202 may be able to recognize, for example, that the character of the movement comprised physically lifting the wireless control device 120o or 200. In an example embodiment, the processor 202 may translate the character of the movement into a function associated with whichever particular scene was activated when the processor 202 detected an actuation of the at least one actuator 214. After detecting the actuation, the processor 202, via the wireless circuitry 212, may send a function command to the respective network device 120a-120o associated with the triggered function. For example, the network manager device 110 may correspondingly raise the volume of the speaker (e.g., speakers 120f) in the example scene described above.

The processor 202 and network manager device 110 may be able to associate different functions based on the way the wireless control device 120o or 200 is moved. For example, the processor may generate a different communication correlating to a different function of network devices 120a-120o based on the following types of movements: up to down; down to up; left to right; right to left; diagonally up and right; diagonally up and left; diagonally down and right; diagonally down and left; clockwise rotation; counter-clockwise rotation; forward; and backward. A scene may have a different function associated with a different movement. For example, as part of the same scene, the following movements and functions may be associated: an up/down movement may light or dim lights (e.g., lights 120e); a left/right movement may raise or lower blinds (e.g., blinds 120d); a clockwise/counter-clockwise rotation may increase or decrease the volume of speakers (e.g., speakers 120f); and a diagonal movement may fast forward, rewind, skip, or repeat a song of multimedia device (e.g., multimedia device 120f).

The wireless control device 120o or 200 may be managed or controlled via a graphical user interface on one or more computing devices connected to the network 100. In this regard, the one or more computing devices may comprise a personal computer (e.g., laptop computer 120b, desktop computer 120c), and/or handheld devices (e.g., tablet 120j, mobile/smart phone 120k, smart watch 120m), for example. The wireless control device 120o or 200 may be operable to communicate with the one or more computing devices 120b, 120c, 120j, 120k, 120m, via the network 230 and network manager device 110, for example. The one or more computing devices 120b, 120c, 120j, 120k, 120m, may manage and control the wireless control device 120o or 200 either locally (hardwired) or remotely (wireless via the network manager 110 and the network 230). The wireless control device 120o or 200 may be managed and controlled by the one or more computing devices 120b, 120c, 120j, 120k, 120m, utilizing, for example, a downloaded application which is associated with the wireless control device 120o or 200. The network manager device 110 may have a localization module that may be operable to track locations of one or more wireless control devices 120o or 200.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer (e.g., processor 202), thereby causing the machine and/or computer to perform the steps as described herein for a network manager device 110 and/or wireless control device 120o or 200 for automation.

Accordingly, aspects of the present disclosure may be realized in hardware, software, or a combination of hardware and software. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for managing at least one network element device in a network using a network manager device and a wireless control device, the method comprising:
    establishing a wireless connection between the wireless control device and the network manager device;
    associating a plurality of scenes for controlling the at least one network element device with a respective plurality of actuators, wherein at least a portion of each of the plurality of actuators is positioned on the exterior of the wireless control device;
    detecting at least one actuation of the plurality of actuators and determining which of the plurality of actuators has been actuated;
    subsequent to the detection of the at least one actuation, sensing a movement of the wireless control device with an accelerometer in the wireless control device;
    sending a communication regarding a character of the movement from the wireless control device to the network manager device, wherein the communication further comprises an identity of the determined one of the plurality of actuators; and
    instructing, by the network manager device, the at least one network element device to implement one of the plurality of scenes based at least in part on the character of the movement and the identity of the determined one of the plurality of actuators.

2. The method of claim 1, wherein the at least one network element device comprises multiple network element devices that implement the scene.

3. The method of claim 1, wherein the character of the movement comprises whether the wireless control device is moving or not moving.

4. The method of claim 1, wherein the character of the movement comprises an acceleration of the movement of the wireless control device.

5. The method of claim 1, wherein the character of the movement comprises a duration of the movement of the wireless control device.

6. The method of claim 1, wherein the character of the movement comprises a dimension of the movement of the wireless control device.

7. A method for operating a network manager device, the method comprising:
    establishing a wireless connection with a wireless control device;
    associating a plurality of scenes for controlling at least one network element device with a respective plurality of actuators of the wireless control device, wherein at least a portion of each of the plurality of actuators is positioned on the exterior of the wireless control device;
    receiving from the wireless control device a communication comprising a character of the movement of the wireless control device and an identity of the plurality of actuators; and
    instructing, the at least one network element device to implement one of the plurality of scenes based at least in part on the character of the movement and the identity of the plurality of actuators.

8. The method of claim 7, wherein the at least one network element device comprises multiple network element devices that implement the scene.

9. The method of claim 7, wherein the character of the movement comprises whether the wireless control device is moving or not moving.

10. The method of claim 7, wherein the character of the movement comprises an acceleration of the movement of the wireless control device.

11. The method of claim 7, wherein the character of the movement comprises a duration of the movement of the wireless control device.

12. The method of claim 7, wherein the character of the movement comprises a dimension of the movement of the wireless control device.

13. A wireless control device comprising:
    a plurality of actuators configured to receive at least one actuation, wherein at least a portion of each of the plurality of actuators is positioned on the exterior of the wireless control device;
    an accelerometer;
    a processor;
    wireless communication circuitry;
    wherein:
        the processor is configured to detect the at least one actuation of the plurality of actuators and to determine which of the plurality of actuators has been actuated;
        the accelerometer is configured to, subsequent to the detection of the at least one actuation, sense a movement of the wireless control device and generate a movement signal regarding a character of the movement;
        the processor is configured to receive the movement signal and translate the movement signal into a communication, wherein the communication further comprises an identity of the determined one of the plurality of actuators; and
        the wireless communication circuitry is configured to receive the communication and wirelessly transmit the communication over a network, wherein the communication is transmitted to cause at least one network element device to be controlled based at least in part on the character of the movement and the identity of the determined one of the plurality of actuators.

14. The wireless control device of claim 13, wherein the character of the movement comprises whether the wireless control device is moving or not moving.

15. The wireless control device of claim 13, wherein the character of the movement comprises an acceleration of the movement of the wireless control device.

16. The wireless control device of claim 13, wherein the character of the movement comprises a duration of the movement of the wireless control device.

17. The wireless control device of claim 13, wherein the character of the movement comprises a dimension of the movement of the wireless control device.

18. The wireless control device of claim 13, wherein the accelerometer is configured to sense the movement of the wireless control device simultaneously while the processor detects an actuation of the at least one actuator.

* * * * *